Figures 1, 2:
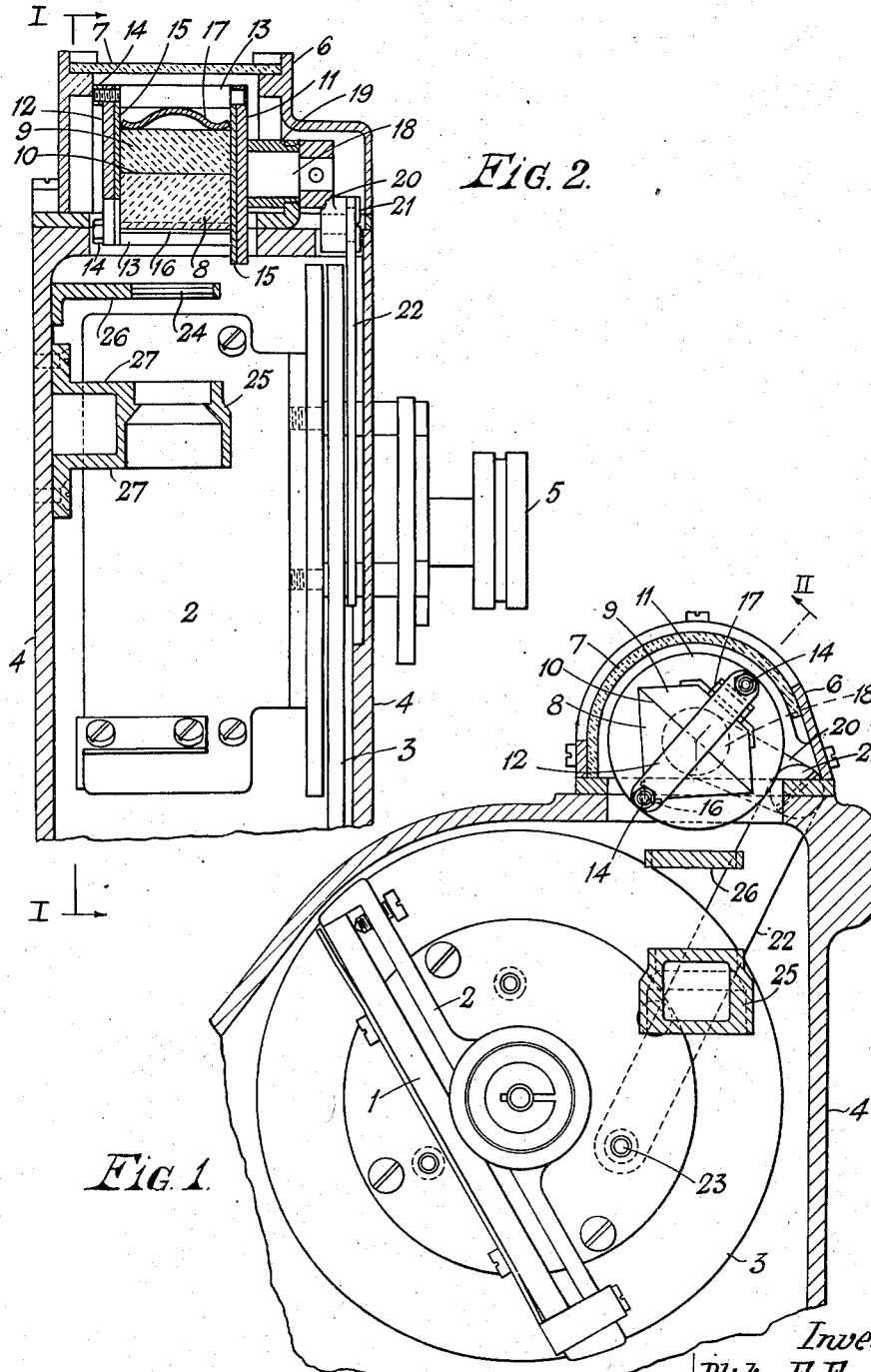

Feb. 18, 1941. P. F. EVERITT 2,232,518
ILLUMINATING MEANS FOR OPTICAL INSTRUMENTS FOR MEASURING ANGLES
Filed April 16, 1940

Inventor
Philip F. Everitt
by Wilkinson & Mawhinney
Attorneys.

Patented Feb. 18, 1941

2,232,518

UNITED STATES PATENT OFFICE 2,232,518

ILLUMINATING MEANS FOR OPTICAL INSTRUMENTS FOR MEASURING ANGLES

Philip Francis Everitt, Ilford, England, assignor of two-thirds to Arthur Joseph Hughes, Chigwell Row, England, and Henry Hughes & Son, Limited, London, England, a corporation of Great Britain, jointly Application April 16, 1940, Serial No. 329,991
In Great Britain March 24, 1939

5 Claims. (Cl. 88—2.4)

This invention relates to illuminating means for optical instruments for measuring angles, such as sextants or like instruments, and the invention is more particularly concerned with the illumination of the bubble system or other arrangement used as an artificial horizon or vertical datum in instruments for observing the altitude of the sun or other sufficiently luminous body.

In such instruments there is usually an angularly movable index mirror or prism, the rotation of which forms the basis of the altitude measurement or other angular measurement and one object of the present invention is to provide illuminating means which will give suitable and evenly distributed illumination of the bubble chamber or other datum device, while a further object is to enable the proper illumination to be obtained, without the provision of a special source of light, by utilising natural sources of light. Another object is to arrange for such light to be properly directed on to the bubble chamber or other datum device despite changes in the direction from which the light arrives.

These and other objects may be achieved by the provision of a separate reflecting member to reflect the light of the sun or other luminous body on to the bubble chamber or other datum device, the additional reflecting member being rotatable and coupled to the mounting of the main index mirror or prism so as to rotate at the same or approximately the same angular rate, thus providing illumination of the bubble system or other part whatever may be the altitude of the sun or luminous body.

In the case of instruments in which a direct sighting device is used instead of a reflector for making an altitude or other angular measurement, the additional reflecting member used for illuminating the bubble is coupled to the sighting device so as to turn at half the rate of movement of the sighting device or telescope.

The light reflected by the additional reflecting member may be passed either directly to the bubble chamber or other device to be illuminated, or may be passed through one or more diffusing screens or filters, or both.

A construction according to the invention, as applied to a mirror sextant, is illustrated by way of example in the accompanying drawing, in which—

Fig. 1 is a sectional elevation (on line 1—1 of Fig. 2) of the relevant portions of the instrument, and Fig. 2 is a sectional end elevation on line 11—11 of Fig. 1.

The index mirror of the sextant, the rotation of which forms the basis of an altitude measurement, is indicated at 1 and is held in a frame 2 attached to a disc 3 supported by the casing 4 of the instrument and rotatable for coarse adjustment of the mirror 1 by the knob 5 projecting from the exterior of the casing, and also rotatable through small angular movements by a fine adjustment mechanism (not shown). The actual manner of rotating the mirror 1 forms no part of the present invention and may be carried out in any convenient manner.

At the top of the casing 4 is a hood 6 carrying a transparent cover 7 and forming a housing for the additional reflecting member which in this case consists of a pair of triangular prisms 8, 9, of glass having their hypotenuse surfaces 10 in contact. The contacting surfaces 10 are preferably silvered, although if total internal reflection of the light takes place they need not be silvered. The prisms 8, 9 are held at their ends between a disc 11 and a flat strip 12 which is secured to the disc 11 but spaced therefrom at the correct distance by pillars 13 riveted at one end in the disc 11 and screwed at their other ends to receive nuts 14 by which the strip 12 is held in place. Layers 15 of cushioning material such as rubber are interposed between the disc 11 and strip 12 and the ends of the prisms. One longitudinal edge of prism 8 is also held in an angle piece 16 integral with or mounted on a pillar 13 and the opposite apical edge of the prism 9 is cut away as shown (since this portion is not needed for light transmission) and the quadrangular prism so formed is held by a spring clip 17 mounted between the face of the prism and the adjacent pillar 13.

The disc 11 has an integral axis pin 18 mounted in a bearing 19 so that the prisms 8, 9, and their carrier are rotatable about an axis parallel with the axis of rotation of the main index mirror 1 of the sextant. The projecting end of the pin 18 has secured to it a projecting arm 20 which has its free end pivoted by screw 21 to one end of a link 22 which at its other end is pivoted at 23 to the disc 3 carrying the main mirror 1. The distance of the pivot 23 from the axis of rotation of the mirror 1 (i. e. the centre of the disc 3) is the same as the distance between the screw 21 and the axis of the pin 18 so that the reflecting prisms 8, 9, rotate at the same rate as the mirror 1.

The light from the sun or other luminous body which is being observed enters through the transparent cover 7 and is reflected by the common surface 10 of the rotatable prism arrangement through a light filter or diffusing screen 24 on to the bubble system within the bubble chamber indicated diagrammatically at 25. The screen 24 is mounted on the casing 4 by a bracket 26 and the bubble chamber 25 is supported from the casing 4 by brackets or arms 27. The bubble chamber is thus illuminated during all the rotations of the index mirror 1.

Instead of the additional reflecting means such as the prisms 8, 9, being coupled by an arm and link to the main rotational part of the sextant, there may be used any suitable gearing or other form of motion transmission device which will enable the additional reflector to be rotated at the same, or approximately the same, rate as the main mirror.

In the case of optical angular measuring instruments in which a direct sighting device, such as a telescope, is used the reflector for illuminating the bubble system or other datum device is geared or coupled to the sighting device so as to turn at half the rate of the sighting device, for instance the length of the arm 20 and the distance of the pivot 23 of the link 22 from the axis of rotation of the sighting device are made unequal.

Other suitable reflecting means such as a single mirror prism may be used instead of the combination of prisms 8, 9, and the invention is also applicable to the illumination of instrument parts other than the bubble system above referred to.

If it is necessary or desirable there may be interposed between the rotatable reflecting member (e. g. the prisms 8, 9) and the particular instrument part to be illuminated, one or more fixed reflectors or optical devices, such as lenses, or combinations thereof. This provides for cases where a single reflection may not be sufficient to direct the illumination on to a particular part of the instrument or where the light may require to be directed or defined more precisely.

What I claim as my invention and desire to secure by Letters Patent is:

1. In an optical instrument for angular measurement having an artificial horizon and a rotatable index member; a reflecting member to direct light from a natural source on to said artificial horizon, a carrier for said reflecting member, means for rotating the reflecting member and carrier about an axis parallel with the axis of rotation of said index member, and a mechanical coupling connecting said carrier with the index member for rotating the reflecting member simultaneously with said index member.

2. In a sextant or like instrument having a bubble system and a rotatable index mirror or prism; a reflecting member for directing light from a natural source on to the bubble system of the sextant, a carrier for said reflecting member mounted to allow the carrier and reflecting member to be rotated about an axis parallel with the axis of rotation of the sextant index mirror or prism, and coupling means comprising an arm projecting from said carrier and a link connecting the mounting of the sextant index mirror with said arm to ensure rotation of the reflecting member simultaneously with the rotation of the index mirror.

3. Means for illuminating a bubble system of a sextant or like instrument having a rotatable reflecting index means by light from the luminous body whose altitude is measured, comprising a reflecting member mounted for rotation about an axis parallel to the rotational axis of said reflecting index means and means coupling said reflecting member to said reflecting index means so as to rotate said reflecting member therewith and constantly reflect the light from the observed luminous body on to the sextant bubble system.

4. Means for illuminating a bubble system of an observation instrument, having a rotatable reflecting index means, by light from a luminous body whose altitude is to be measured, comprising a pair of triangular prisms having their hypotenuse surfaces in engagement, a frame for supporting said triangular prisms for rotation about an axis parallel to the rotational axis of said reflecting index means, a light transmitting casing covering said triangular prisms, means coupling said frame to said reflecting index means to cause them to rotate together and cause said prisms to constantly reflect light from said luminous body onto said bubble system while making a measurement.

5. In an optical instrument for angular measurement having an artificial horizon and a rotatable indexing member, a reflecting member to direct light from a natural source onto said artificial horizon, means supporting said reflecting member for rotation, means coupling said reflecting member and said index member for rotating the reflecting member simultaneously with said index member.

PHILIP FRANCIS EVERITT.